United States Patent [19]

Soodak

[11] Patent Number: 4,606,604
[45] Date of Patent: Aug. 19, 1986

[54] OPTICAL FIBER SUBMARINE CABLE AND METHOD OF MAKING

[75] Inventor: Charles Soodak, Silver Spring, Md.

[73] Assignee: Optelecom, Inc., Gaithersburg, Md.

[21] Appl. No.: 610,837

[22] Filed: May 16, 1984

[51] Int. Cl.⁴ .............................................. G02B 6/44
[52] U.S. Cl. ................................................ 350/96.23
[58] Field of Search .................................... 350/96.23

[56] References Cited

U.S. PATENT DOCUMENTS

| | | | |
|---|---|---|---|
| 3,813,098 | 5/1974 | Fischer et al. | 350/96.23 |
| 4,072,398 | 2/1978 | Larson et al. | 350/96.23 |
| 4,097,119 | 6/1978 | Kumamaru et al. | 350/96.23 |
| 4,110,001 | 8/1978 | Olszewski et al. | 350/96.23 |
| 4,146,302 | 3/1979 | Jackimowicz | 350/96.23 |
| 4,156,104 | 5/1979 | Mondello | 350/96.23 |
| 4,160,872 | 7/1979 | Lundberg et al. | 350/96.23 |
| 4,199,224 | 4/1980 | Oestreich | 350/96.23 |
| 4,239,336 | 12/1980 | Parfree et al. | 350/96.23 |
| 4,278,835 | 7/1981 | Jackson | 350/96.23 |
| 4,317,000 | 2/1982 | Ferer | 350/96.23 |
| 4,341,440 | 7/1982 | Trezeguet et al. | 350/96.23 |
| 4,359,598 | 11/1982 | Dey et al. | 350/96.23 |
| 4,371,234 | 2/1983 | Parfree et al. | 350/96.23 |

FOREIGN PATENT DOCUMENTS 2029048A 3/1980 United Kingdom .
2085187A 4/1982 United Kingdom .

OTHER PUBLICATIONS

Kojima et al, *Submarine Optical Fiber Cable: Development and Laying Results;* Applied Optics; vol. 21, No. 5; Mar. 1, 1982; pp. 815-821.

*Primary Examiner*—William L. Sikes
*Assistant Examiner*—Robert E. Wise
*Attorney, Agent, or Firm*—Kerkam, Stowell, Kondracki & Clarke

[57] ABSTRACT

An optical fiber submarine cable includes a fiber optic bundle sealed within a precompressed electrically conductive tube defining a hermetic cavity. An inner layer of helically wound copper-plated steel wires is disposed around the electrically conductive tube. An outer layer of oppositely helically wound copper-plated steel wires is preferably disposed around the inner layer. The wires are tightly wound at a pitch of between 8° and 20° and the outer wires balance the torque from the inner wires. An insulation layer of polyethylene surrounds the outer armor layer. A method of making the cable uses precompression of the tube to increase the strength of the cable.

6 Claims, 2 Drawing Figures

OPTICAL FIBER SUBMARINE CABLE AND METHOD OF MAKING

BACKGROUND OF THE INVENTION

This invention relates to submarine cable and, more specifically, an optical fiber submarine cable. Further, this invention relates to a method of making an optical fiber submarine cable.

Optical fiber submarine cables have sometimes used a hermetic tube to surround and enclose the optical fibers. The tube prevents moisture from weakening the fiber. The hermetic tube additionally prevents pressure from causing microbending of the fiber which will in turn attenuate or weaken the optical signal. In some submarine cables, the tube is made of highly conductive copper or aluminum and serves to supply electrical power to optical repeaters spaced along the cable. When the tube is made of conductive material, it is enclosed within electrical insulation to insulate it from the water.

Generally, the hermetic tube may be continuously roll formed from flat strip. The tube material is continuously fed and shaped around a continuously fed optical fiber or group of fibers. The seam resulting from the roll forming of the flat strip around the optical fibers is then welded or soldered shut. In either case, the strip must be of relatively low temper or hardness in order to accept the change in shape from flat to tubular. The resulting tube accordingly has a low yield strain such that if the tube is stretched longitudinally, say 0.5%, then the tube will take on a permanent elongation of 0.2% when the tension is relaxed. This causes residual stress to be applied to the optical fibers inside of the tube, thereby greatly decreasing their life expectancy. In addition, if such soft tube is repeatedly subjected to tensile stress, it is prone to cracking or necking down (decrease in diameter due to axial stretching). Either of these will result in reduced electrical conductivity and may cause high local strain on the optical fibers within the hermetic tube.

Typical designs try to avoid yield strain by incorporating a large number of strength members such as steel, Kevlar, or carbon fibers. In order to make the cable so strong that its hermetic tube will not yield under any foreseeable operating conditions, the submarine cables end up being very large and heavy.

The following U.S. patents show various designs which have heretofore been used for cables:

| U.S. Pat. No. | Inventor | Issue Date |
| --- | --- | --- |
| 4,072,398 | Larsen et al | Feb. 7, 1978 |
| 4,097,119 | Kumamaru et al | June 27, 1978 |
| 4,110,001 | Olszewski et al | Aug. 29, 1978 |
| 4,146,302 | Jachimowicz | Mar. 27, 1979 |
| 4,156,104 | Mondello | May 22, 1979 |
| 4,160,872 | Lundberg et al | July 10, 1979 |
| 4,199,224 | Oestreich | Apr. 22, 1980 |
| 4,239,336 | Parfree et al | Dec. 16, 1980 |
| 4,278,835 | Jackson | July 14, 1981 |
| 4,317,000 | Ferer | Feb. 23, 1982 |
| 4,341,440 | Trezeguet et al | July 27, 1982 |
| 4,359,598 | Dey et al | Nov. 16, 1982 |
| 4,371,234 | Parfree et al | Feb. 1, 1983 |

The Larsen et al patent discloses a communication cable using optical fibers and an outer coating. The optical fibers are loosely twisted together and provided with tension-relieving wires and sheathed to form a cable with interspaces filled with lubricants.

The Kumamaru et al patent shows an optical fiber cable using cushioning layers made of nonwoven plastic fabric or foamed plastic. An outer sheathed layer made of a composite of metal and plastic is also used.

The Olszewski et al patent discloses an optical fiber cable construction including a seam welded metalic tube to protect the optical fiber. The optical fiber is placed within a helical channel in a core element.

The Jachimowicz patent discloses an optical fiber cable having optical fibers helically wound within a welded metal tube. When the cable is stretched, the fibers remain relaxed due to their helical construction.

The Mondello patent discloses a submarine cable including optical fibers and cable strength members including a central filament and layers of stranded steel wires separated from the central filament by an insulating core member. A metalic tube surrounds the layers of stranded steel wire and provides a DC path for powering optical repeaters and a hermetic moisture-barrier for the fibers.

The Lundberg et al patent discloses a floating cable system including a metalic protective layer around inner electrical conductors.

The Oestreich patent discloses an optical fiber cable including helical extending chambers in which the optical fibers are disposed. Additionally, an apparatus for constructing the cable is disclosed.

The Parfree et al '336 patent shows an optical fiber communication cable including optical fibers within a copper tube. A plastic layer surrounds the copper tube and strength members are disposed around the plastic layer. An outer sheath surrounds the strength members.

The Jackson patent shows an optical fiber submarine cable wherein the optical fibers are disposed in petroleum jelly within a copper or aluminum tube. Polycarbonate surrounds the tube and in turn is surrounded by an aluminum water barrier. Inner and outer layers of steel wires are wound in opposite directions around the aluminum water barrier. Mylar tape and polyethylene layers surround the outer wire layers. The inner and outer wires press against each other and against the aluminum water barrier to make the cable rigid when it is under hydrostatic pressure.

The Ferer patent discloses a cable including a plurality of electrically conductive wires or a bundle of optical fibers surrounded by an extrusion of plastic. An inner layer of KEVLAR fibers surrounds the plastic and is oppositely wound from an outer helical layer of alternating KEVLAR and nylon fibers separated from the inner layer of wires by a thin plastic film. A braided outer jacket or covering surrounds the outer layer of wires.

The Trezeguet et al patent discloses a submarine optical fiber cable including a drawn copper tube having a longitudinal weld and surrounding the optical fibers. Liquid is disposed within the tube, whereas its outside is surrouded by a polyolefin outer sheath, for example polyethylene.

The Dey et al patent shows an overhead electric transmission system including an optical fiber or optical fiber bundle. Different layers of wires surround a core in which the optical fibers are disposed. Adjacent layers of wires are wound in opposite directions.

The Parfree et al '234 patent discloses a submarine optical fiber cable including optical fiber within an aluminum tube surrounded by an inner layer of armouring wires and a polyetheylene layer. This in turn is surrounded by an additional layer of low density polyethylene having a bedding material such as jute or polypropylene fibers around it. Just outside the jute or polypropylene fiber layer are outer steel armor wires followed by an additional layer of jute or polypropylene fibers.

The following documents disclose various other cable designs:

| Document | Publication Date |
| --- | --- |
| UK Patent Appln. 2,085,187A | April 21, 1982 |
| UK Patent Appln. 2,029,048A | March 12, 1980 |
| "Submarine Optical Fiber Cable: Development and Laying Results" by Kojima et al - In APPLIED OPTICS, Vol. 21, No. 5, pgs. 815-821. | March 1, 1982 |

The UK published patent application No. 2,029,048A discloses an optical fiber submarine cable including a power supplying and pressure resisting layer which may be formed from a tape-like material into a pipe-like configuration. Tension resisting wires are wound around the power supplying pressure resisting layer and in turn are surrounded by insulation. An outer sheath surrounds the insulation. The wire layer is used as a surge attenuator since it is made of lower conductivity material than the power supplying layer.

UK patent application No. 2,085,187A discloses an optical fiber cable construction including one or more optical fibers disposed within a conductive tube and surrounded by reinforcing elements. The reinforcing helically wound elements are in turn surrounded by conductive elements wound in the opposite direction.

The magazine article "Submarine Optical Fiber Cable; Development and Laying Results" discloses various design criteria for submarine optical fiber cable. Additionally, it shows a torqueless armoring structure wherein a cable core is surrounded by inner and outer armoring layers of oppositely wound wires.

OBJECTS AND SUMMARY OF THE INVENTION

Accordingly, it is a primary object of the present invention to provide a new and improved submarine optical fiber cable.

A further object of the present invention is to provide a new and improved method of making submarine optical fiber cable.

A more specific object of the present invention is to provide a submarine optical fiber cable having a smaller size and weight of the cable for a given conductivity and strength.

Yet another object of the present invention is to provide an optical fiber submarine cable including a hermetic cavity defining tube which will return to its original length after a stetching tension has been released. That is, it will greatly resist permanent elongation resulting from application of a tension.

A still further object of the present invention is to provide a system wherein strengthening wires may be used to bridge current flow if a crack develops in a power supplying tube.

The above and other objects of the present invention which will become apparent as the description proceeds are realized by an optical fiber submarine cable comprising: an optic fiber or bundle; a precompressed electrically conductive tube defining a hermetic cavity in which the optical fiber or bundle is disposed; an inner armor layer having a plurality of electrically conductive inner wires helically wound tightly around the tube in one direction at a pitch of between 8° and 20°; and, an external insulation layer. The cable preferably includes an outer armor layer having a plurality of electrically conductive outer wires helically wound tightly around the inner armor layer in an opposite direction to the one direction and having a pitch of between 8° and 20°, torque from the outer armor layer balancing torque from the inner armor layer, and the insulation layer is around the outer armor layer. The tube is a high conductivity copper alloy and the cable is less than ¼" in diameter. The cable construction causes the tube to return from a stressed yield condition to within 0.1% of its precompressed length. The inner wires and outer wires preferably are copper-plated steel wires. The cable has a density of less than 20 lbs./1000 feet and a break strength at least 800 lbs. The interstices of the inner wires and the outer wires are filled with gel. The tube has a solder or weld seam and extends axially and has a yield of more than 40,000 psi. The tube has an outer diameter of less than 0.11". The fiber optic bundle includes at least one optical fiber.

The method of the present invention is realized by a method of making an optical fiber submarine cable comprising the steps of: continuously roll forming an electrically conductive tube from a flat strip, the tube formed around an optic fiber or bundle; applying a precompression to the tube; constructing an inner armor layer by helically winding a plurality of electrically conductive inner wires tightly around the tube in one direction at a pitch of between 8° and 20°; and applying an insulation layer outside of the inner armor layer. Preferably, the method further comprises constructing an outer layer by helically winding a plurality of electrically conductive outer wires tightly around the inner armor layer in an opposite direction to the one direction and having a pitch of between 8° and 20° and the insulation layer is applied around the outer armor layer.

BRIEF DESCRIPTION OF THE DRAWINGS

The above and other features of the present invention will be more readily understood by consideration of the detailed description in conjunction with the accompanying figures wherein like characters represent like parts throughout the several views and in which.

DETAILED DESCRIPTION OF THE DRAWINGS

Figure 1:
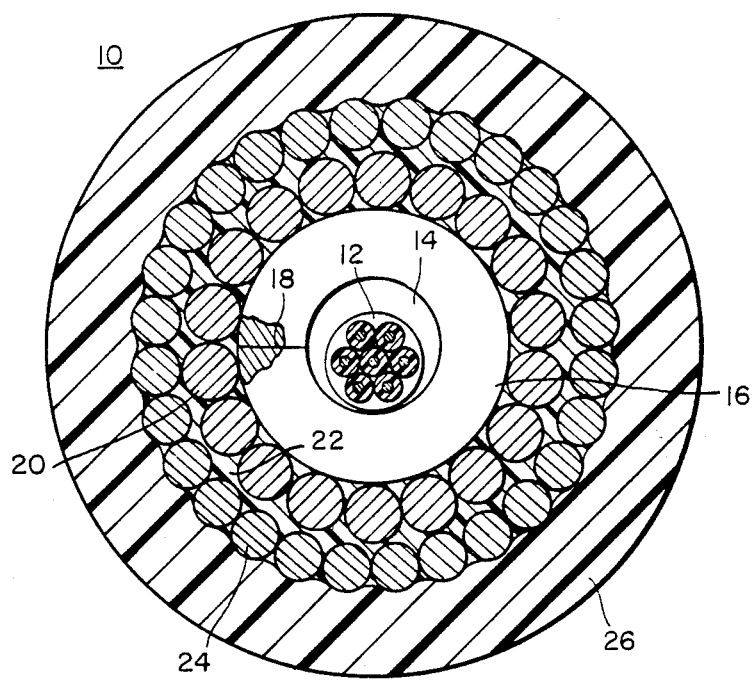
FIG. 1 shows a cross section of the cable construction of the present invention.
Figure 2:
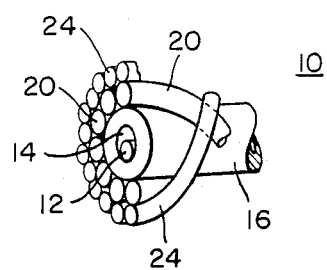
FIG. 2 shows a simplified perspective view of several parts of the present invention.

Tur ing now to FIGS. 1 and 2, the specific construction of the present invention will be discussed in detail. FIG. 1 shows a cross section view taken perpendicular to the axis of the cable 10 according to the present invention. FIG. 2 shows a perspective simplified view of several parts of the cable 10 of the present invention.

The cable 10 of the present invention includes an optical fiber or bundle 12 which is disposed within the hermetic cavity 14 defined by the precompressed electrically conductive tube 16. The tube 16 is roll formed from a flat strip and is then welded or soldered at the seam 18 to provide a water tight and pressure resistant layer to protect the fiber optic bundle 12. Surrounding the tube 16 is an inner armor layer of inner wires 20 which in turn are surrounded by an outer armor layer including outer wires 24. For ease of illustration, only one of the inner wires and one of the outer wires has been numbered. A gel 22, such as Flexgel, is disposed within the interstices or gaps between the inner and outer wires as well as the gaps between adjacent inner wires and between adjacent outer wires. Finally, an outer insulation layer 26 is disposed around the outer armor layer having outer wires 24.

As best shown in FIG. 2, the outer armor wires 24 are helically wound in the opposite direction to the inner armor wires 20. In FIG. 2, only two of the inner and two of the outer wires have been numbered.

The inner wires 20 and outer wires 24 are disposed at a pitch of between 8° and 20°. At higher than 10° helix angle, the wires should be preformed. At helix angles below 15°, glue may be used to increase friction between the inner wires 20 and the tube 16. However, at helix angles above 15°, glue is not necessary since large loop compression is generated when the cable is stetched. This causes large friction between the tube 16 and the wires 20 and 24 without the necessity of glue. In such cases where glue is not needed to bond the wires to the tube, the space between the wires 20 and 24 may be filled with an inert compound such as Flexgel 22 in order to prevent hosing.

The tube 16 is preferably a copper alloy tube having an outer diameter between 0.050 and 0.125" such as made by Olin Brass and sold as alloy 151, zirconium copper. Since this alloy yields at 0.53% strain, the cable 10 must not be stretched more than this amount during installation. This would normally require a rather large cable to prevent yield during use, but the precompressed feature of the present invention discussed in detail below minimizes this problem.

Turning to the specific dimensions, materials, and specifications of a preferred embodiment of the present invention, it is highly preferred that the cable 10 is less than ¼" in diameter. Further, the cable 10 accordingly to the present invention has a density of less than 20 lbs. per 1,000 feet and has a break strength of at least 800 lbs. The tube 16 has a yield of more than 40,000 lbs. per square inch.

The tube 16 is a high conductivity copper alloy tube having an outer diameter of 0.1". The inner armor wires 20 are copper plated steel music wires having an 18° right hand pitch and a center to center distance of 0.021" which is also the diameter of the wires. The 18 inner wires 20 are thus quite tightly wound around the copper tube 16. There are 28 outer armor wires 24 which are copper plated steel music wires having a 15° left hand pitch and a center to center distance of 0.018" which is also their diameter. The outer armor wires 24 balance the torque of the inner armor wires 20 to minimize torsion stress upon the copper tube 16. A more detailed discussion of torque balancing may be found in the above listed magazine article entitled "Submarine Optical Fiber Cable; Development and Laying Results", and the Ferer patent discussed above. These documents are hereby incorporated by reference.

The insulation layer 26 is preferably low density or high density polyethylene having a thickness of 0.035".

Obviously, the specific density will depend upon the desired application for the cable 10.

The specifications of an embodiment of the present invention are as follows:
 copper tube 16: I.D. 0.028", 0.D. 0.0535"
 wires 20: 15 strands, diameter 0.013"
 overall O.D.: 0.120"
 Max working load: 600 lbs.
 break strength: 800 lbs.
 electrical resistance: 20 ohms/km
 density: 16 lbs./1000 ft.

An important feature of the present invention is that the strength members or inner and outer wires 20 and 24 are applied to the tube 16 in a unique manner. Specifically, the tube 16 is precompressed prior to having the inner wires 20 and outer wires 24 tightly wound around it. The tube is constructed by an assembly method which applies an axial or longitudinal precompression to the tube, this feature greatly increasing the yield point of the cable 10 under tension. Basically, if the steel wires are applied under more total tension than is applied to the tube during cabling, the cable 10 will be made with the tube compressed.

As an example, if the tube is compressed to say 50% of its yield point, which will be approximately 0.25% strain for the copper alloy discussed above, the number of pounds of force that can be applied to the cable before yielding will be tripled. That is, any stress will have to overcome the precompression of the tube 16 before it even begins to apply a tension strain to the tube 16. Additionally, the tube 16 in the cable 10 will return from a stressed yield condition to within 0.1% of its prestressed length.

An additional benefit of the present construction is that the copper plated steel wires 20 (and possibly 24) provide a bridging path for current flow if a crack should somehow develop within the copper tube 16.

The total outer diameter of the preferred embodiment discussed above will be approximately 0.348".

The copper tubing 16 is used to carry current which supplies various repeaters stationed along the length of the cable 10.

Although FIG. 1 shows a preferred embodiment cable 10 which uses outer wires 24, a simplified embodiment may be constructed identically to cable 10 without the outer wires 24. The simplified one armor layer embodiment would not be torque-balanced, but would have the advantages of the precompressed tube 16.

The method of making the optical fiber submarine cable according to the present invention includes the step of continuously roll forming the electrically conductive tube 16 from a flat strip, the tube being formed around the optic fiber or bundle 12 and having a welded or soldered axially extending seam 18. Precompression is applied to the tube and an inner armor layer is constructed by helically winding a plurality of electrically conductive inner wires 20 tightly around the tube 16 in one direction at a pitch of between 8° and 20°. The precompression of tube 16 may be accomplished by applying wires 20 under high tension to tube 16 under low tension, wires 24 also applied under high tension. As clearly shown in FIG. 1, the wires 20 are the radially innermost wires around the tube 16. When the system is relaxed the wires 20 and 24 compress the tube 16. The tension applied to wires 20 and 24 is 40–80% of their rated breaking strength. The outer armor layer of helically wound electrically conductive outer wires 24 extend tightly around the inner armor layer in an opposite direction to the one direction and having a pitch of between 8° and 20°. An insulation layer 26 is applied around the outer armor layer having the outer wires 24.

If the wires 20, 24 are to be constructed at helix angles of greater than 10°, they should be preformed by bending them into a helix as they pass through the planetary armoring machine used for armoring. Preforming eliminates the natural tendency of the wires to unwind and become straight, thus increasing the stability of the cable. At lower helix angles the wires have less of a straightening tendency, so preforming is less important. A less common way to stabilize the cable is to glue the wires in place.

Although specific materials, dimensions, and constructions details have been discussed, it is to be understood that these may be for illustrative purposes only. The scope of the present invention should be determined by reference to the specific limitations recited in the appended claims since various modifications and adaptations may occur to those of ordinary skill in this art.

What is claimed is:

1. An optical fiber submarine cable comprising;
    (a) at least one optic fiber;
    (b) a longitudinally precompressed electrically conductive tube defining a hermetic cavity in which said optic fiber is disposed;
    (c) an inner armor layer having a plurality of electrically conductive inner wires helically wound tightly around said tube in one direction at a pitch of between 8° and 20°; and
    (d) an external insulation layer;
and wherein said cable is less than ⅜" in diameter, and wherein said tube is longitudinally precompressed to approximately 50% of its yield point such that said tube will return from a stressed yield condition to within 0.1% of its precompressed length.

2. The optical fiber submarine cable of claim 1 wherein said tube is a high conductivity copper alloy.

3. The optical fiber submarine cable of claim 1 further comprising:
    an outer armor layer having a plurality of electrically conductive outer wires helically wound tightly around said inner armor layer in an opposite direction to said one direction and having a pitch of between 8° and 20°, torque from said outer armor layer balancing torque from said inner armor layer, and
wherein said insulation layer surrounds said outer armor layer.

4. The optical fiber submarine cable of claim 3 wherein said inner wires and said outer wires are copper plated steel wires.

5. An optical fiber submarine cable comprising:
    (a) at least one optic fiber;
    (b) a longitudinally precompressed electrically conductive tube defining a hermetic cavity in which said optic fiber is disposed;
    (c) an inner armor layer having a plurality of electrically conductive inner wires helically wound tightly around said tube in one direction at a pitch of between 8° and 20°; and
    (d) an external insulation layer; and
wherein said tube is longitudinally precompressed to approximately 50% of its yield point such that said tube will return from a stressed yield condition to within 0.1% of its precompressed length.

6. The optical fiber submarine cable of claim 5 further comprising:
    an outer armor layer having a plurality of electrically conductive outer wires helically wound tightly around said inner armor layer in an opposite direction to said one direction and having a pitch of between 8° and 20°, torque from said outer armor layer balancing torque from said inner armor layer, and
wherein said insulation layer surrounds said outer armor layer.

* * * * *